No. 720,294. PATENTED FEB. 10, 1903.
R. STONE.
CARRIAGE BODY.
APPLICATION FILED MAY 28, 1901. RENEWED JULY 17, 1902.
NO MODEL.
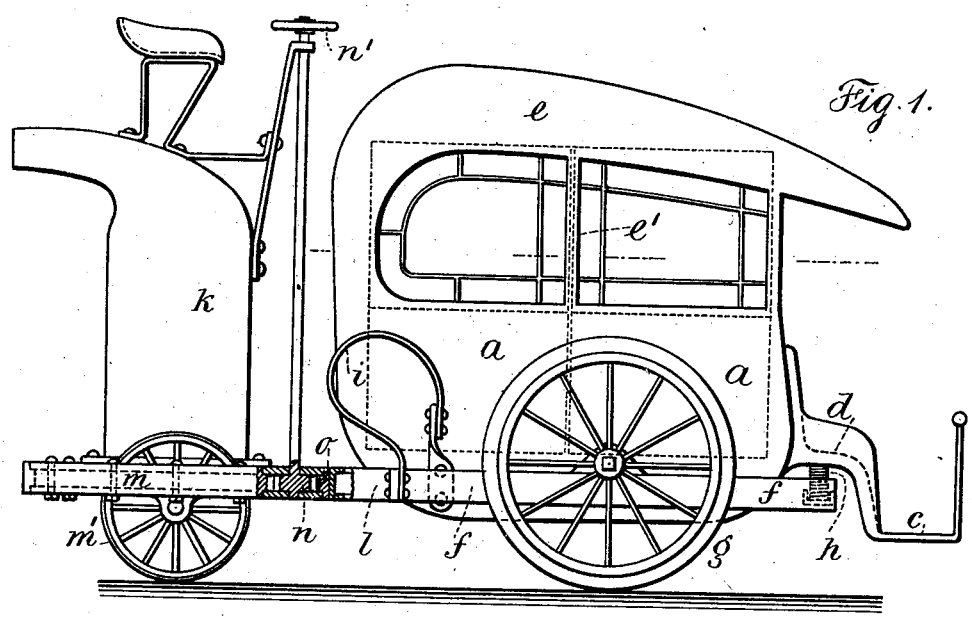
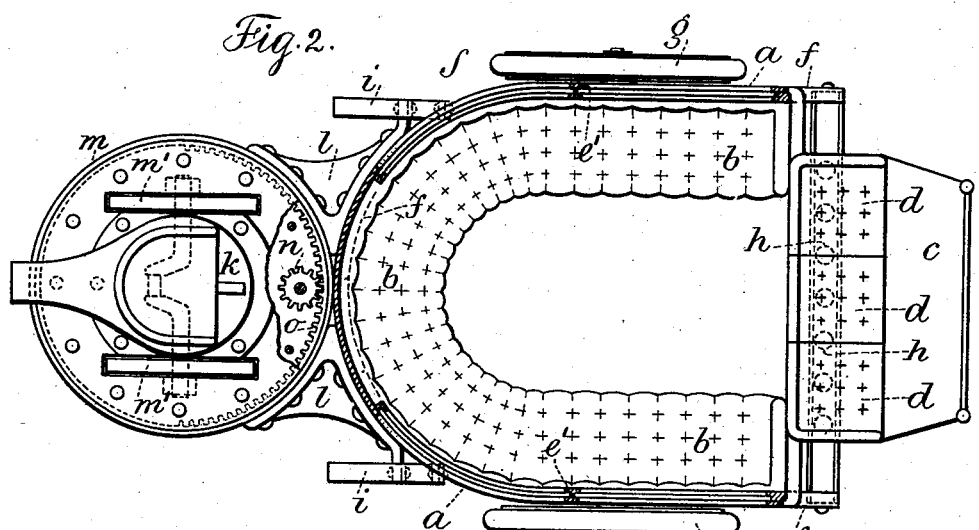
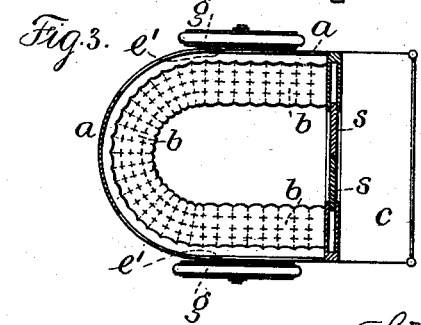
Witnesses:
J. Staib
Chas H. Smith
Inventor
Roy Stone
per L. W. Serrell & Son
Attys.

UNITED STATES PATENT OFFICE.

ROY STONE, OF WASHINGTON, DISTRICT OF COLUMBIA.

CARRIAGE-BODY.

SPECIFICATION forming part of Letters Patent No. 720,294, dated February 10, 1903.

Application filed May 28, 1901. Renewed July 17, 1902. Serial No. 115,950. (No model.)

*To all whom it may concern:*

Be it known that I, ROY STONE, a citizen of the United States, residing at Washington, in the District of Columbia, have invented a new and useful Improvement in Carriage and Automobile Bodies, of which the following is a specification.

My invention relates to a form of carriage and automobile bodies especially adapted for cross-country and touring purposes and in warm climates or seasons, and in carrying out my invention the body is of U shape, with a concentric seat and low entrance-platform, and seats may be employed at the open end of the U-shaped body, and a closed top is joined to the body at the semicircular or back part and overhangs the entrance-platform or the seats thereof. The carriage or automobile body is entered from the platform and through a door in an end frame or through a passage formed between the end seats by removing the middle seat, which may be hinged to swing for this purpose, and between the top and the body the sides and open end are not inclosed, except by windows that slide down in pockets and serve to exclude dust and rain. A frame of substantially U form and closed across the end is provided for supporting the body by springs at the forward end and preferably by C-springs upon the sides toward the back, the axles of the wheels being directly connected to the said frame. The motor device is back of the body, and the same may comprise any well-known or desired mechanism, the same forming no part of my invention. I prefer, however, to place the motor device behind the U-shaped body, so that the heat generated thereby will not be felt by the occupants of the vehicle.

In the drawings, Figure 1 is an elevation, partially in section; Fig. 2, a sectional plan representing my improvement, and Fig. 3 represents a modification.

The body $a$ is of U shape and may be made of any desired material. Within the same I provide a concentric seat $b$, so that within the seat is an open space for the entrance and exit of the passengers, the seat being of a form providing a view for the passengers both forward and at the opposite sides. The U-shaped end of the body may be open or provided with glass sash and a door, and it is provided with a platform $c$, placed lower than the floor of the body of the vehicle, so as to be accessible for entrance to and exit from the vehicle at the respective sides, and seats $d$ are preferably provided across the open end of the vehicle-body and above the platform $c$, the seats being so placed that the occupants look ahead. The central seat is removable or, in other words, hinged so as to be swung over out of the way to provide a passage between the platform and the vehicle-body for the movement of the passengers. The top $e$ is preferably closed at the back and joined to the body $a$—that is, at the semicircular or back portion of the body—and the said top preferably overhangs the seats $d$ of the platform $c$, and the sides between the body $a$ and top $e$ are open, there being light supports $e'$ between the said parts. Windows to exclude dust and rain are preferably provided that slide down into pockets in the sides. A metal frame $f$ is provided of substantially the same U form as the vehicle-body $a$, the said frame, however, having a part between and connecting the ends. The axles of the wheels $g$ are connected directly to opposite sides of the frame $f$ in any desired manner, and I prefer to employ helical springs $h$ under the front of the vehicle-body and upon the frame to support the front of the vehicle and large C-springs $i$ at the sides near the body, with one end of the springs connected to the body and the other end to the frame.

In the modification Fig. 3 I have shown a body similar to the body in the other figures, but with a front end partition and sliding doors $s$ and a platform across the front providing entrance and exit to the vehicle at its ends. In this form of device the front seats are not employed.

The motor devices shown in the drawings are simply illustrative and form no part of my invention, as any form of motor or steering mechanism may be employed. I have, however, for the purpose of showing a complete device illustrated a motor device $k$ with a seat above the same for the motorman, a motor-frame $m$ of circular form, to which wheels $m'$ are connected, and an encircling frame, with brackets or braces *l* for connecting the same to the frame *f*, supporting the vehicle-body.

As a means for guiding the vehicle I have illustrated a pinion *n* and hand-wheel *n'*, the pinion engaging a circular rack *o* on the inner surface of the motor-frame *m*. As illustrated, it is proposed that two wheels shall carry the vehicle-body and two the motor device, the pivotal connection between the two providing for changing the alinement of the wheels, so as to guide and direct the vehicle-body in the desired direction.

I claim as my invention—

1. The combination with a suitable supporting-frame of substantially U shape, two supporting-wheels and springs, of a vehicle-body of substantially U shape and conforming with the frame and hung within the same, an interior concentric seat to the vehicle-body and a low entrance-platform at the forward open end, substantially as set forth.

2. The combination with a suitable supporting-frame of substantially U shape, two supporting-wheels and springs, of a vehicle-body of substantially U shape and conforming with the frame and hung within the same, an interior concentric seat to the vehicle-body, a low entrance-platform at the forward open end and a cover connected to the vehicle-body and overhanging the platform, substantially as set forth.

3. In a vehicle and in combination with a suitable supporting-frame and two wheels, of a body of substantially U form, the semicircular part of which forms the back, an inner concentric seat conforming to the body, a low platform across the front of the vehicle, and a top connected to the body at the semicircular back and open between the same and the body at the sides and overhanging the front, and a motor device rearward of the semicircular back and a connection therefrom to the supporting-frame, substantially as set forth.

4. The combination with the substantially U-shaped vehicle-body *a*, the semicircular portion of which forms the back, the concentric seat *b* within the body, a low entrance-platform *c* and seats *d* across the front of the body above the platform, with a central seat removable and a top *e*, of a frame *f* of metal of substantially the form of the vehicle-body, connections therefrom for the axles of the wheels, helical springs *h* at one end under the forward portion of the vehicle-body and large C-springs *i* at the sides and near the rear of the vehicle-body and connected at their respective ends to the body and the frame, substantially as set forth.

5. In a vehicle and in combination with a suitable supporting-frame and two wheels, of a body of substantially U form, the semicircular part of which forms the back, an inner concentric seat conforming to the body, seats across the open forward portion, the central seat of which is movable to provide a passageway for the passengers, a low platform across the front of the vehicle in front and forward of the said cross-seats, a top connected to the body at the semicircular back and open between the same and the body at the sides and overhanging the front seats, and a motor device rearward of the semicircular back and a connection therefrom to the supporting-frame, substantially as set forth.

6. The combination with a carriage-body, a supporting-frame and two wheels therefor, of a motor device behind the carriage-body and means for supporting the same, devices for pivotally connecting the motor-supporting devices and the carriage-body-supporting frame and for turning the former with reference to the latter for guiding the vehicle, substantially as set forth.

Signed by me this 22d day of August, 1900.

ROY STONE.

Witnesses:
GEO. F. CHAMBERLIN,
S. T. HAVILAND.